(12) United States Patent
Smith et al.

(10) Patent No.: US 7,728,539 B2
(45) Date of Patent: Jun. 1, 2010

(54) METHODS AND APPARATUSES FOR MEASURING VCM BEMF AT A VCM CONTROL UPDATE RATE

(75) Inventors: Craig Smith, Santa Clara, CA (US); Stan Shepherd, Morgan Hill, CA (US); Xin Yang, Fremont, CA (US); Yu Sun, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 386 days.

(21) Appl. No.: 11/750,839

(22) Filed: May 18, 2007

(65) Prior Publication Data

US 2008/0007271 A1 Jan. 10, 2008

Related U.S. Application Data

(60) Provisional application No. 60/747,778, filed on May 19, 2006.

(51) Int. Cl.
*H02P 6/18* (2006.01)

(52) U.S. Cl. .............................. 318/400.34; 318/400.3; 318/459; 318/442

(58) Field of Classification Search ............ 318/400.34, 318/459, 461, 479, 504, 400.3, 400.39, 442; 360/75
See application file for complete search history.

(56) References Cited

U.S. PATENT DOCUMENTS

| 6,034,496 | A | * | 3/2000 | Male | 318/400.34 |
|---|---|---|---|---|---|
| 6,542,324 | B1 | * | 4/2003 | Galbiati et al. | 360/75 |
| 6,611,118 | B2 | | 8/2003 | Abe et al. | |
| 6,864,656 | B2 | | 3/2005 | Abe et al. | |
| 7,215,094 | B2 | * | 5/2007 | Maiocchi et al. | 318/459 |
| 7,362,538 | B2 | * | 4/2008 | Lee et al. | 360/78.04 |
| 2002/0141098 | A1 | * | 10/2002 | Schlager | 360/75 |

* cited by examiner

*Primary Examiner*—Bentsu Ro
*Assistant Examiner*—Thai Dinh
(74) *Attorney, Agent, or Firm*—McCarthy Law Group

(57) ABSTRACT

Devices and methods for performing dynamic sampling of a back electromotive force (BEMF) measurement are provided. A device has hardware, including a voice coil motor (VCM) for receiving a VCM command signal and a correction circuit, for obtaining the VCM command signal and a coil voltage measurement from the hardware, where the correction circuit removes a transient voltage measurement due to a change in the VCM command signal from the coil voltage measurement and outputs an estimated BEMF measurement.

9 Claims, 5 Drawing Sheets coil voltage measurement

METHODS AND APPARATUSES FOR MEASURING VCM BEMF AT A VCM CONTROL UPDATE RATE

CROSS-REFERENCE TO RELATED PATENT APPLICATIONS

The instant application claims priority and benefit from U.S. Provisional Application No. 60/747,778, filed on May 19, 2006, incorporated herein by reference in its entirety.

BACKGROUND

Embodiments of the present invention relate generally to disk drives. Specifically, embodiments of the present invention relate to methods and apparatuses for performing dynamic sampling of a back electromotive force (BEMF) measurement.

In hard disk drives back electromotive force (BEMF) is used as a way to measure the velocity of an actuator arm. It is important to be able to accurately control the velocity of the actuator arm without having to access the positioning information of the read/write head, which is attached to the arm. For Self-Servo-Writing applications, accurate velocity control translates to accurate positioning of the read/write head during repeated motions across the disk surface. Accurate velocity control also prevents mechanical stresses from occurring on the slider and head and improves acoustics and reliability, for example, in ramp Load/Unload operations. Further, accurate velocity control allows for more mechanical design options (i.e., the design of ramps) which may increase the usable area of the disk surface and in turn save manufacturing costs.

In a hard disk drive, a BEMF voltage drop is created across the coil while the coil is moving in a magnetic field. The voltage observed across the coil during normal operation is the combined effect of actuator BEMF (a function of actuator angular velocity) and the impedance of the coil (both resistive and inductive effects) in response to a voice coil motor ("VCM") command. Changes to the VCM command will (through the impedance of the coil and amplifier dynamics) contribute to voltage drops across the VCM that are not due to induced BEMF.

In conventional disk drive applications, the sample rate for BEMF measurements is limited because one has to wait for the voltage in the coil to reach a steady state after a command change. Various methods have been used to collect BEMF measurements by measuring a voltage across a coil. In order to take the measurement, the VCM driver is disengaged then the coil voltage is measured after a set amount of time has elapsed. To obtain measurements with a constant VCM current a calibrated inductive and/or resistive ("IR") cancellation is employed. In addition, the VCM current is kept constant for a specified amount of time.

U.S. Pat. Nos. 6,611,118 and 6,864,656 are directed to a magnetic disk drive and voice coil motor drive circuit. The disk drive has a BEMF sensor that detects the BEMF produced in a VCM actuator. The BEMF sensor accepts as input the coil terminal voltage of the voice coil motor and outputs the voltage as a band limited signal and accepts as input the drive current of the voice coil motor and outputs a voltage proportional to the drive current. A computation circuit takes the difference between the two outputs to obtain the BEMF measurement.

The main disadvantage of the above-described methods is time delay. In order to take the BEMF measurement the known systems must wait a discrete time period for transient voltages across the coil due to amplifier/coil dynamics to sufficiently decay. In turn, the sample rate of the BEMF measurement is limited. Further, if the BEMF is sampled at too fast a rate, the accuracy of the measurement will be degraded. This has a direct impact on the responsiveness of the control system for the hard disk.

Accordingly, a method and device is needed to cancel the effects of the coil impedance and amplifier dynamics on the voltage drop across a VCM. Further, a method and device is needed that is capable of sampling BEMF measurements at a rate comparable to the rate at which the VCM command signal changes.

SUMMARY

According to one embodiment of the invention, a device for performing dynamic sampling of a back electromotive force (BEMF) measurement includes hardware, including a voice coil motor (VCM) for receiving a VCM command signal. In addition, the device includes a correction circuit, for obtaining the VCM command signal and a coil voltage measurement from the hardware, wherein the correction circuit removes a transient voltage measurement due to a change in the VCM command signal from the coil voltage measurement and outputs an estimated BEMF measurement.

According to another embodiment of the invention, a disk drive includes a digital-to-analog converter for receiving a voice coil motor (VCM) command signal and analog hardware for receiving the VCM command signal and outputting a coil voltage measurement. In addition, the device includes an analog-to-digital converter for receiving and converting the coil voltage measurement and a correction circuit, for obtaining the VCM command signal and the coil voltage measurement, and for removing a transient voltage measurement due to a change in the VCM command signal from the coil voltage measurement, and for outputting an estimated BEMF measurement.

According to still another embodiment, a method for dynamically sampling a back electromotive force (BEMF) measurement includes the steps of receiving a VCM command signal, receiving a coil voltage measurement, removing a transient voltage measurement due to a change in the VCM command signal from the coil voltage measurement and outputting an estimated BEMF measurement.

According to yet another embodiment of the invention, a method for identifying a transient voltage in a voice coil motor, includes the steps of constraining a VCM arm to zero velocity, inputting a range of constant VCM command signals, recording a steady-state coil voltage measurement, obtaining a DC/proportional effect on the coil voltage measurement and a reference voltage deviation from nominal and constant sensor biases based on a relationship between the VCM command signals and the coil voltage measurement, performing a series of step changes to the VCM command signals, recording transient responses of the coil voltage measurement and averaging the transient responses of the coil voltage measurement.

It is to be understood that both the foregoing general description and the following detailed description are exemplary and explanatory only, and are not restrictive of the invention as claimed.

DETAILED DESCRIPTION OF PREFERRED EMBODIMENTS

Reference will now be made to the accompanying drawings, which assist in illustrating various pertinent features of embodiments of the present invention. Although embodiments of the present invention will now be described primarily in conjunction with disk drives, it should be expressly understood that embodiments of the present invention may be applicable to other applications as well. For example, embodiment of the present invention may be applied to compact disc (CD) drives, digital versatile disk (DVD) drives, and the like. In this regard, the following description of a disk drive is presented for purposes of illustration and description. Like numbers refer to like elements throughout the description of the figures. Although some of the diagrams include arrows on communication paths to show what may be a primary direction of communication, it is to be understood that communication may occur in the opposite direction to the depicted arrows.

Figure 1:
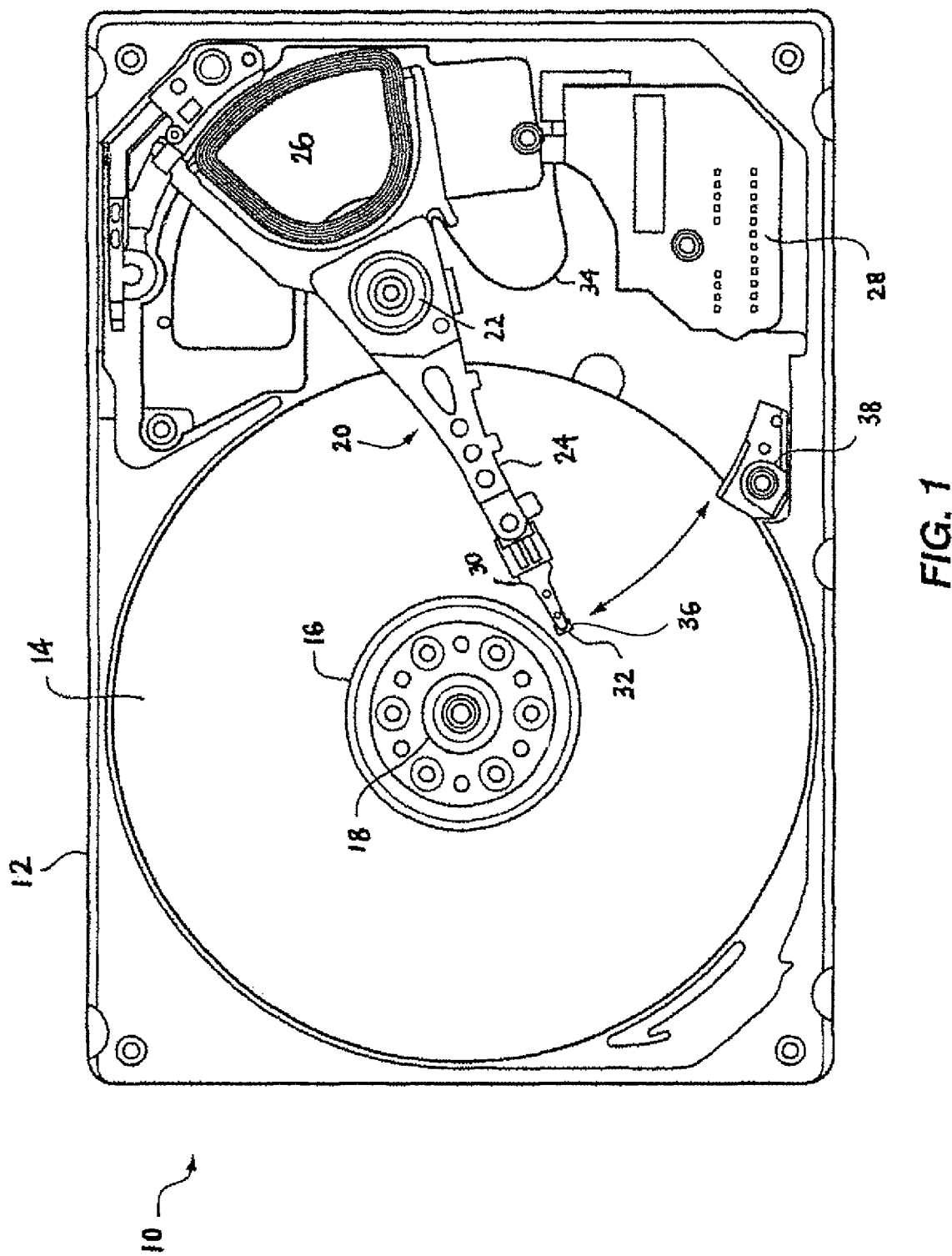
FIG. 1 is a diagram of a hard disk drive according to one embodiment of the invention.

FIG. 1 illustrates a disk drive 10 in accordance with an embodiment of the present invention. The disk drive 10 generally includes a base plate 12 and a cover (not shown) that may be disposed on the base plate 12 to define an enclosed housing or space for various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips, or the like, that cantilever from a common structure. In any case, movement of the actuator arm assembly 20 is provided by an actuator arm drive assembly, such as a voice coil motor 26, or the like. The voice coil motor 26 may be a magnetic assembly that controls the operation of the actuator arm assembly 20 under a direction of control electronics 28.

The actuator arm assembly 20 may further include one or more load beam(s) or suspension(s) 30, where each suspension 30 may be attached to the free end of a respective actuator arm 24 and cantilever therefrom. Typically, the suspension 30 is biased generally toward its corresponding disk 14 by a spring-like force. A slider 32 is disposed at or near the free end of each suspension 30. The biasing forces exerted by the suspension 30 on its corresponding slider 32 thereby attempt to move the slider 32 in the direction of its corresponding disk 14. Typically, this biasing force is such that if the slider 32 were positioned over the corresponding disk 14 without the disk 14 being rotated at a sufficient velocity, the slider 32 would be in contact with the disk 14. The disk drive 10 includes a transducer or head 36 as part of the slider 32 for reading data from and/or writing data to a surface of the disk 14.

The head 36 on the slider 32 is interconnected with the control electronics 28 of the disk drive 10 by a flex cable 34 that is typically mounted on the actuator arm assembly 20. Signals may be exchanged between the head 36 and its corresponding data storage disk 14 for disk drive read/write operations. In this regard, the voice coil motor 26 is utilized to pivot the actuator arm assembly 20 to simultaneously move the slider 32 along a path and across the corresponding data storage disk 14 to position the head 36 at a desired or required radial position on the disk 14 (i.e., at an approximate location of a desired track on the data storage disk 14) for disk drive read/write operations.

When the disk drive 10 is not in operation, the actuator arm assembly 20 may be pivoted to a parked position to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired parking function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or landing on the corresponding data storage disk 14, and the slider 32 would remain on the disk 14 until disk drive operations were re-initiated.

The slider 32 of the disk drive 10 may be configured to "fly" on an air bearing during rotation of its corresponding data storage disk 14 at a sufficient velocity. The slider 32 may be disposed at a pitch angle such that its leading edge is disposed further from its corresponding data storage disk 14 than its trailing edge. The head 36 would typically be incorporated on the slider 32 generally toward its trailing edge since this edge may be positioned closest to its corresponding disk 14. Other pitch angles and orientations could also be utilized for flying the slider 32.

According to one embodiment, the present invention allows VCM 26 BEMF measurements to be collected at a faster update rate, preferably the same rate as the VCM 26 command signal is being updated. BEMF voltage can be measured as a way to measure the velocity of the actuator arm 20. As stated above, changes to the VCM 26 command signal will (through the impedance of the coil and amplifier dynamics) contribute to voltage drops across the VCM 26 that are not due to induced BEMF. According to one embodiment, the present invention is designed to cancel these effects from a measure of VCM 26 voltage.

It should be understood that the present invention can accommodate any model of electromechanical behavior. For the purpose of simplifying the description of the present invention, the following assumptions will be made. First, the electromechanical system of the hard disk drive is operating in a linear range (small currents and small changes in current). Second, the VCM 26 control signal updates are evenly spaced in time. Finally, the VCM 26 voltage is sampled at a consistent delay from the period of time when the VCM 26 control signal is updated.

In addition, embodiments of the present invention include systems and methods for identifying transient behavior in the hard disk drive 10.

Figure 2:
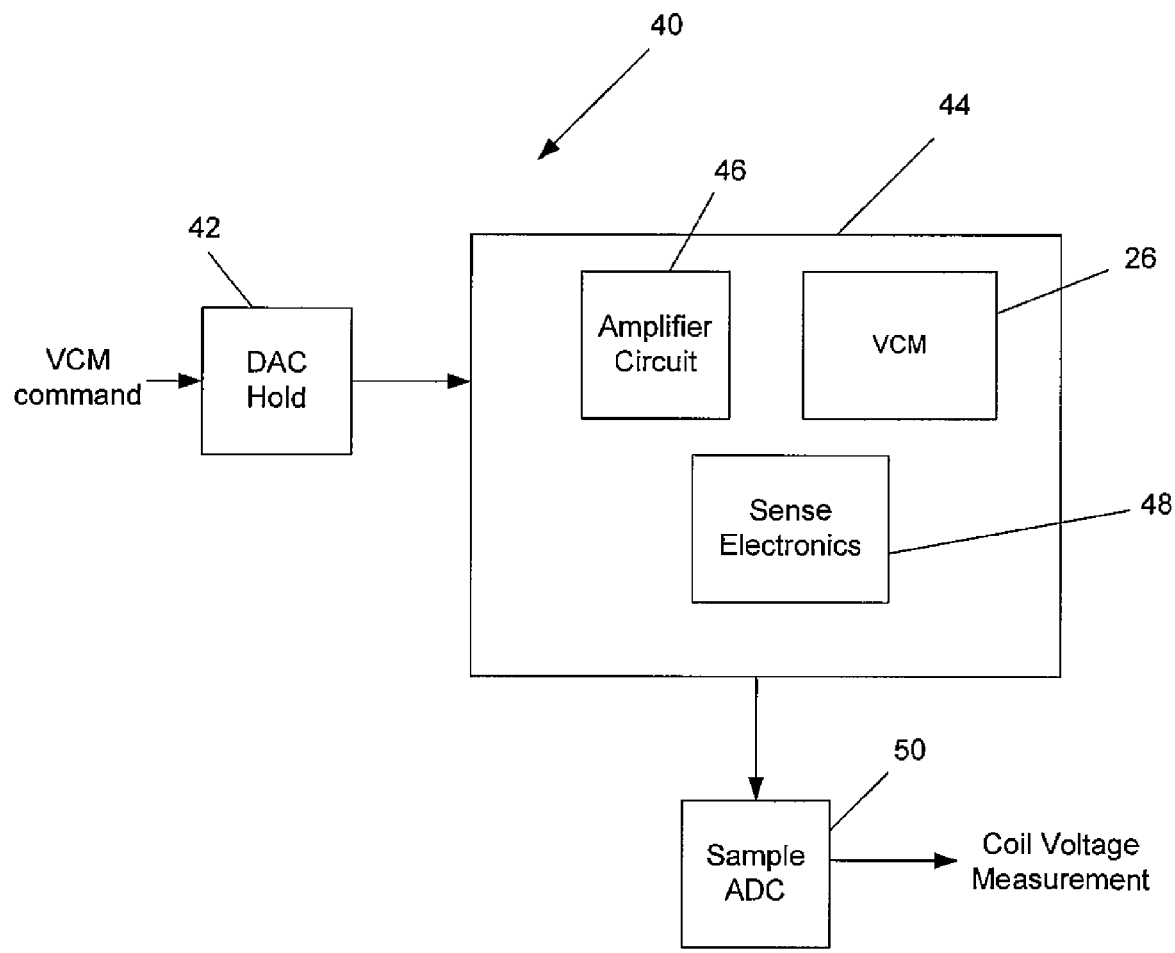
FIG. 2 is a block diagram of a VCM control loop and dynamic sampling device according to one embodiment of the invention.

FIG. 2 is a block diagram of a VCM 26 control loop and dynamic sampling device 40 according to one embodiment of the invention. A digital-to-analog ("DAC") converter 42 receives a VCM 26 command signal as input. The VCM 26 command signal is a digital signal that changes at fixed intervals. The DAC 42 converts the digital VCM 26 command signal to an analog signal and outputs the signal to the analog hardware 44 of the system. The analog hardware 44 includes at least an amplifier circuit 46, sense electronics 48, and the VCM 26. The sense electronics 48 measure the voltage of the voice coil motor 26 and output the measurement to a sample analog-to-digital-converter ("ADC") 50. According to one embodiment, the sense electronics 48 include inductive and/or resistive (IR) compensation for the VCM 26 command current. The ADC 50 converts the analog signal to a digital signal and outputs the digital signal as the coil voltage measurement. The coil voltage is used to synthesize a BEMF voltage measurement.

According to one embodiment of the invention, a finite impulse response (FIR) model relates the VCM 26 command signal history to the coil voltage measurement. In the alternative, the model might also take an infinite impulse response form, a finite impulse response (FIR) form, or a nonlinear dynamic form. The fundamentally assumed FIR relationship is set forth as follows:

$$V\_coil(k)=V\_BEMF(k)+F\_model(DAC(k-1)DAC(k-2),\ldots,DAC(k-N))$$

As shown above, the coil voltage measurement depends on the induced BEMF voltage as well as a contribution that depends entirely upon the finite DAC command history. Physical constants can be associated with the function F_model. For example, the resistance of the VCM 26 contributes solely to the function when the DAC VCM 26 command signal is constant over multiple samples.

Figure 3:
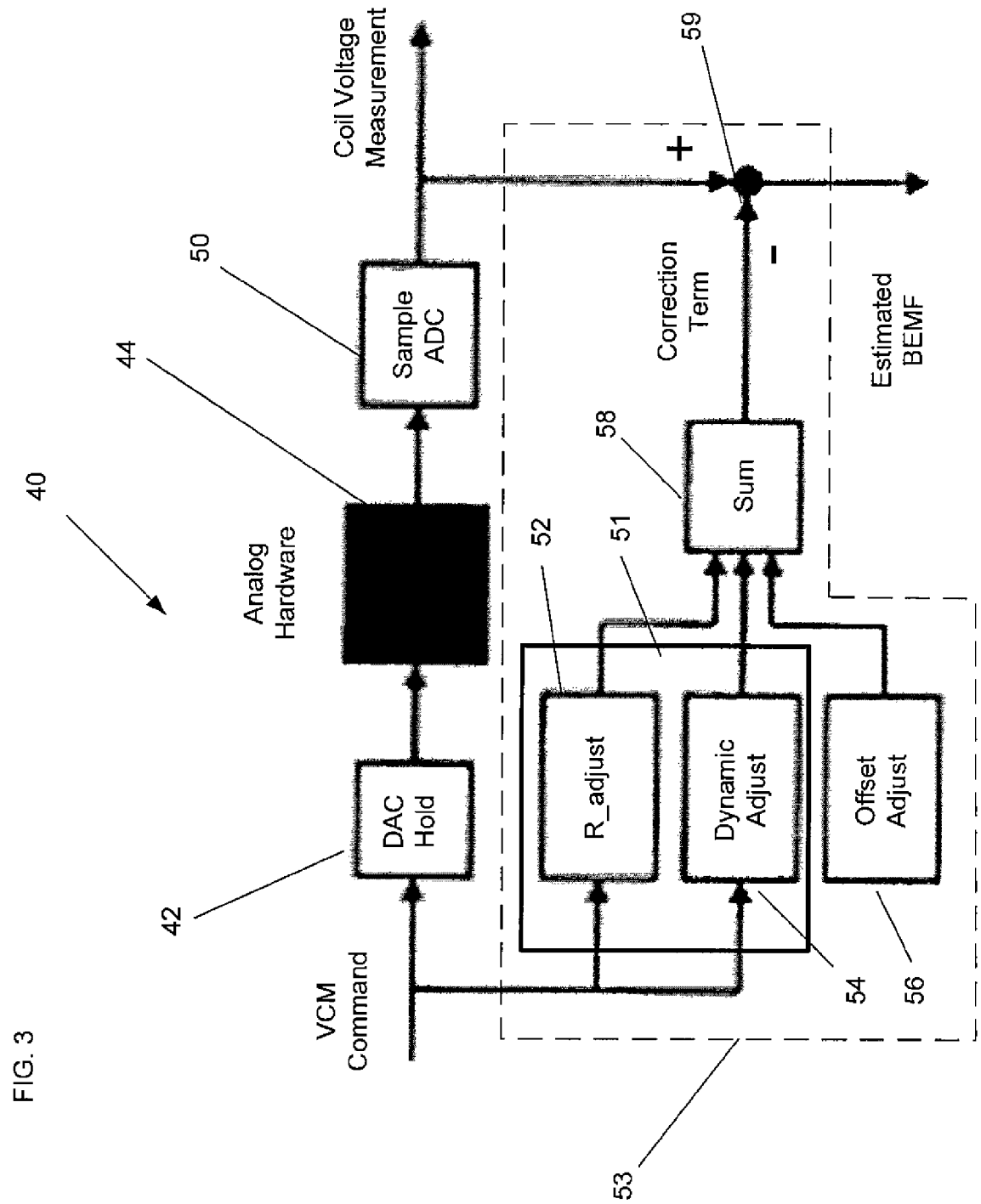
FIG. 3 is a block diagram of a system for removing contributions to the coil voltage other than the VCM BEMF, according to one embodiment of the invention.

According to one embodiment of the invention, FIG. 3 shows a dynamic sampling device 40 for removing contributions to the coil voltage other that the VCM 26 BEMF. According to one embodiment, the system can be implemented in firmware using the digital VCM 26 command and the ADC 50 result of the coil voltage measurement. In the alternative, the system can be implemented using configurable hardware in a motor driver or other device. The correction term is driven by the VCM 26 DAC command. This system can be implemented in conjunction with analog compensation techniques such as IR cancellation circuitry which may partially cancel other contributions to coil voltage before collecting an ADC 50 coil voltage measurement.

According to one embodiment the dynamic sampling device 40 includes hardware 44, including a voice coil motor (VCM) 26 for receiving a VCM command signal that is input from a DAC 42. In addition, the device 40 includes a correction circuit 53 for obtaining the digital VCM 26 command signal and a coil voltage measurement from the hardware 44 via an ADC 50. The correction circuit 53 is configured to remove a transient voltage measurement due to a change in the VCM 26 command signal from the coil voltage measurement and output an estimated BEMF measurement.

The correction circuit 53 includes a FIR filter 51 comprised of an R_adjust module 52 and a dynamic adjust module 54 that receive as input the digital VCM 26 command signal. In addition, the correction circuit 53 includes an offset adjust module 56, a sum module 58 and a computation circuit 59. The offset adjust module 56 compensates for reference voltage deviation from nominal and other constant sensor biases. The R_adjust module 52 isolates the DC/proportional effect included in the VCM 26 command signal and outputs the DC/proportional effect to the sum module 58. The dynamic adjust module 54 isolates the transient effect included in the VCM 26 command signal and outputs the transient effect to the sum module 58. For example, when the VCM 26 command signal is held constant the dynamic adjust signal will be zero.

The combined output of the R_adjust module 52, the dynamic adjust module 54 and an offset adjust module 56 is input into a sum model 58. Preferably, the filter coefficients are constrained to sum to zero. Accordingly, the DC portion of the cancellation is included into the R_adjust term of the correction term. The sum module 58 outputs a correction term. The computational circuit 59 combines the correction term with the coil voltage measurement to obtain the estimated BEMF measurement.

According to one embodiment of the invention, the system can be implemented using the following pseudo c-code.

```
Input variables:              raw_coil_v_measurement
                              Last_VCM_command
Defined model parameters:     R_adjust
                              offset_adjust
                              dynamic_coeff[0-N]
Internal storage parameters:  command_history [0-N]
Output variable:              BEMF_measurement
dynamic_correction = 0.0;
command_history[N] = last_VCM_command;
For (idx = 0; idx<N; idx++)
{
    dynamic_correction +=
    dynamic_coeff[idx]*command_history[idx];
    command_history [idx]=command_history [idx+1];
}
dynamic_correction += last_VCM_command+dynamic_coeff[N];
BEMF_measurement = raw_coil_v_measurement
                   dynamic_correction
                   offset_adjust
                   R_adjust*last_VCM_command;
```

According to one embodiment of the invention, the predefined parameters set forth above are determined through experiments conducted with the VCM 26 arm 20 mechanically constrained to be at zero velocity. In the hard disk drive 10 this can be accomplished by having the arm 20 rest against the mechanical limits of travel. When the arm velocity is zero, there is no BEMF contribution to the coil voltage. Accordingly, the model of the coil voltage as a function of commanded current in this situation should be a model of the desired cancellation voltage.

Figure 4A:
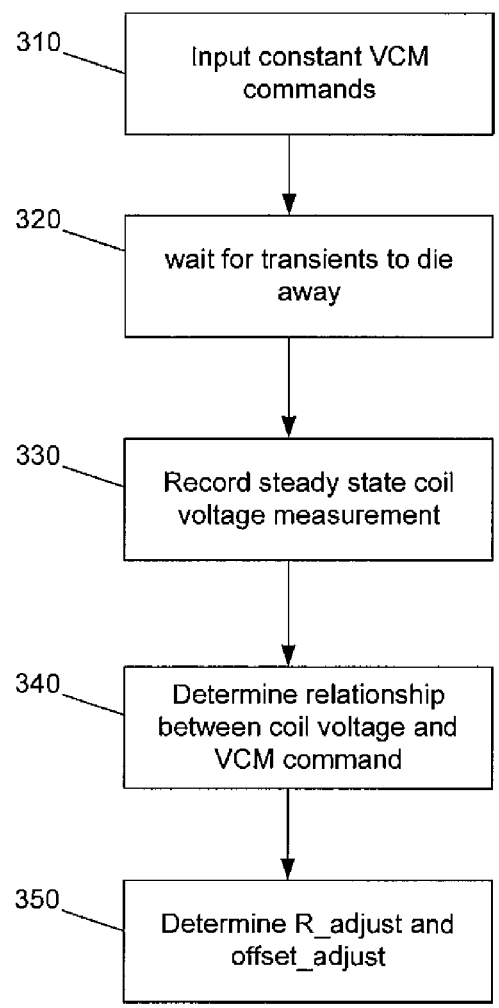
FIGS. 4(a)-4(b) are flow charts illustrating a method for calibrating the system and identifying a transient voltage in a voice coil motor according to one embodiment of the invention.
Figure 4B:
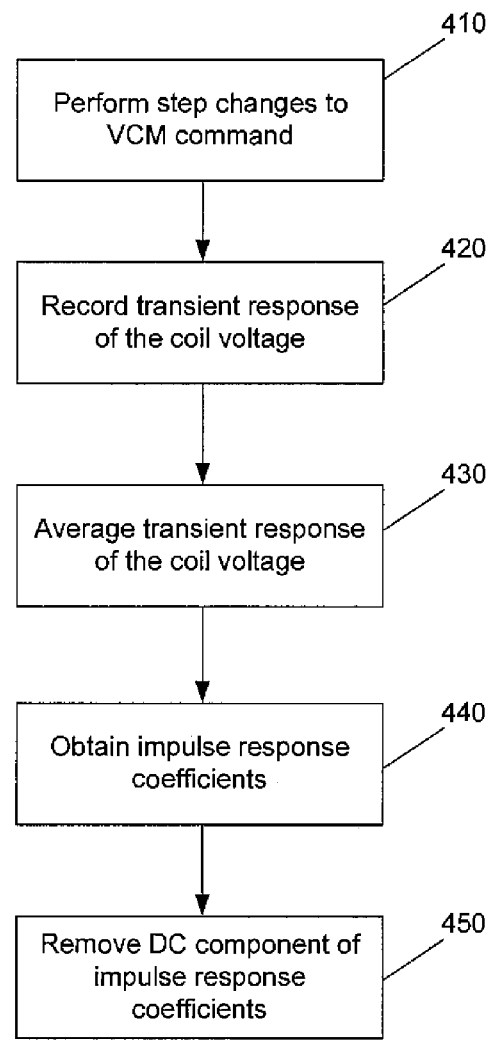

FIGS. 4(a) and 4(b) are flowcharts that illustrate a method for calibrating the system and obtaining a transient voltage in a voice coil motor according to one embodiment of the invention, assuming the VCM 26 is placed at zero angular velocity. The calibration steps described below occur using the same sample rates used in actual operation and the same VCM 26 update to ADC 50 sample delays. First, referring now to FIG. 4(a), a range of constant VCM 26 commands is initiated (Step 310). Next, the system waits for transients to die away in the coil voltage measurement (Step 320). The steady-state coil voltage is the measured (Step 330). As shown in step 340, the relationship between the steady state coil voltage and the VCM 26 command signal is determined. For example, in the expression $$BEMF_{est}=Coil\_Voltage - R\_adjust*VCM\_command - Offset\_adjust$$

the constant parameters R_adjust and Offset_adjust can be determined from any two sets of values for VCM_command and steady-state Coil_voltage as $$R\_adjust=(Coil\_Voltage(1)-Coil\_Voltage(2))/(VCM\_command(1)-VCM\_command(2))$$

and $$Offset\_adjust=Coil\_Voltage(1) - R\_adjust*VCM\_command(1)$$

Typically, a best pair of values for R_adjust and Offset_adjust parameters would be computed, by well-known mathematical techniques, from many such sets of values in order to minimize the effects of noisy measurements. For example, a line can be used to map the relationship between the coil voltage and the VCM 26 command signal. The relationship between independent variable (VCM command) and dependent variable (coil voltage) is fit with a straight line using a least squared parametric fit as a method to find the slope and intercept of the line. The coefficients of the line correspond to the R_adjust 52 and Offset_adjust 56 values (Step 350).

FIG. 4(b) illustrates the second phase of the calibration method, according to one embodiment of the invention. First, a series of step changes is performed to the VCM 26 command (Step 410). Next, the transient response of the coil voltage measurement scaled by the magnitude of the VCM 26 step change command is measured (Step 420). The scaled transient response of the coil voltage measurement is then averaged (Step 430). To obtain the impulse response coefficients, the derivative of the transient response is taken (Step 440). Finally, the DC component of the impulse response coefficients is removed (Step 450).

According to another embodiment of the invention, the parameters described above can be determined while the VCM 26 is in motion by using a model of the effect of a VCM 26 command upon the actuator motion. In this scheme, the identification of a dynamic model for the VCM 26 motion can be combined with an identification of the dynamic model of the sensor dynamics. In the alternative a previously identified model of the motion of the VCM 26 can be used to improve the cancellation scheme. If there exists "good" predictive capability in regards to the motion of the actuator as a function of the VCM command history, the system need not perform the calibrations only with the actuator biased against a mechanical limit of travel. Such a model in its most basic form would be from VMC command->VCM coil current->torque->angular motion. That is, nominally a double integrator model from command to position. There are, however, other dynamic effects to consider (pivot bearing, amplifier).

For example, the physical system commonly responds as an inertial system wherein BEMF varies directly with velocity, velocity is integrated acceleration, and acceleration varies directly with VCM command: BEMF=K*velocity=K*integral(acceleration)=K*integral(VCM_command−Offset_adjust/R_adjust). If Coil_voltage has no other integrating components, then the full response between BEMF and VCM_command (that is, the collection of measurements V_BEMF(k) and V_coil(k)) can be separated mathematically into constant (offset), proportional (e.g. Resistive), integrative (e.g. velocity) and derivative (e.g. inductive) components. All time-delayed dynamic effects would typically be included in the derivative terms. Other measurements can also be used to continually adjust the sensor model during operation.

Figure 5:
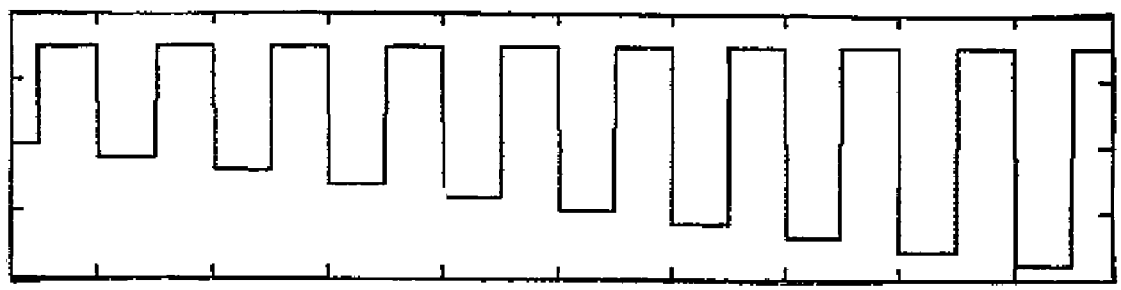
FIG. 5 is a graph illustrating the operation of a dynamic sampling device according to one embodiment of the invention.
Figure 5:
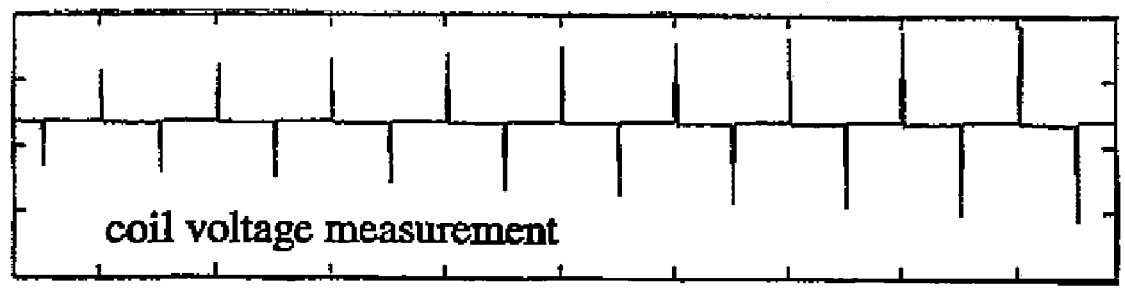
Figure 5:
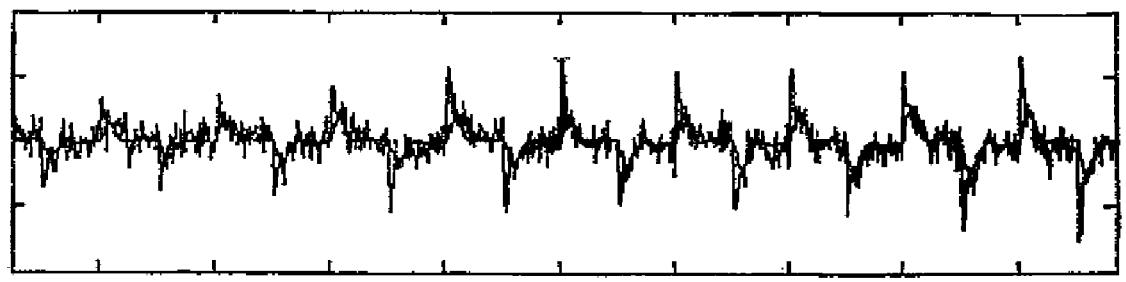

FIG. 5 shows experimental results for the above-described system. An external velocity measurement based upon a non-contact optical sensor was used in this experiment where VCM 26 was forced against a crash stop with varying commanded current. As shown, changes to the VCM 26 DAC command translate to spikes in the raw BEMF signal. The constant level of coil voltage measurement is offset from zero and shifts with the constant DAC command after the transient associated with a DAC command change dies away. After compensation, the BEMF measurement indicates near zero velocity for carrying levels of current. Some motion is observed in the external velocity measurement which accounts for the otherwise non-flat shape of the measured BEMF. The remaining HF noise in the third plot can be eliminated with low pass filtering.

The above-described embodiments of the invention have several advantages. Embodiments of the present invention model sensor dynamics and sensor statistics in order to sample VCM 26 BEMF velocity at a high rate while allowing the system to continue with feedback control actions. In turn, the faster sampling allows for better velocity control during load/unload operations or during spiral writing in a self-spiral write scheme. Because the BEMF is sampled at a faster rate, filtering becomes possible. In turn filtering can be used to reduce the impact of uncorrelated measurement noise on the performance of the closed loop system. In addition, filtering can improve the quality of the BEMF measurement (e.g., in terms of mean squared errors).

The foregoing description of preferred embodiments of the invention has been presented for purposes of illustration and description. It is not intended to be exhaustive or to limit the invention to the precise form disclosed, and modifications and variations are possible in light of the above teaching or may be acquired from practice of the invention. The embodiments were chosen and described in order to explain the principles of the invention and as a practical application to enable one skilled in the art to utilize the invention in various embodiments and with various modifications suited to the particular use contemplated. It is intended that the scope of the invention be defined by the claims appended hereto and their equivalents.

What is claimed is:

1. A device for performing dynamic sampling of a back electromotive force (BEMF) measurement, comprising:
    hardware, including a voice coil motor (VCM), for receiving a VCM command signal; and
    a correction circuit responsive to the VCM command signal and a coil voltage measurement from the hardware, the correction circuit comprising:
        a finite impulse response (FIR) filter for filtering the VCM command signal;

an offset adjust circuit for inputting reference voltage deviation from nominal and constant sensor biases;

a summing circuit for summing outputs of the FIR and the offset adjust circuit; and a computational circuit for determining a difference in an output from the summing circuit and the coil voltage measurement and outputting an estimated BEMF measurement.

2. The device as claimed in claim 1, wherein the finite impulse response filter separates the VCM command signal into a signal representing a DC/proportional effect on the coil voltage measurement and a transient effect on the coil voltage measurement.

3. A disk drive, comprising:

a digital-to-analog converter for receiving a voice coil motor (VCM) command signal;

analog hardware for receiving the VCM command signal and outputting a coil voltage measurement;

an analog-to-digital converter for receiving and converting the coil voltage measurement; and a dynamic sampling correction circuit responsive to the VCM command signal and comprising an offset adjust circuit for inputting reference voltage deviation from nominal and constant sensor biases removing a transient voltage measurement due to a change in the VCM command signal for outputting an estimated BEMF measurement.

4. The disk drive claimed in claim 3, wherein the analog hardware further comprises:

an amplifier circuit;

a voice coil motor electromechanical device for modeling a mechanical motion of an actuator arm; and a back electromotive force sensor, having JR compensation for current associated with the voice coil motor command signal.

5. The disk drive claimed in claim 3, wherein the correction circuit further comprises:

a finite impulse response (FIR) filter for filtering the VCM command signal;

a summing circuit for summing outputs of the FIR filter and the offset adjust circuit; and a computational circuit for determining a difference in an output from the summing circuit and the coil voltage measurement and outputting the estimated BEMF measurement.

6. The disk drive claimed in claim 5, wherein the finite impulse response filter separates the VCM command signal into a signal representing the DC/proportional effect on the coil voltage measurement and a transient effect on the coil voltage measurement.

7. A method for controlling a voice coil arm of a disk drive, comprising:

receiving a VCM command signal;

receiving a coil voltage measurement;

removing a transient voltage measurement due to a change in the VCM command signal in relation to receiving a reference voltage deviation from nominal and constant sensor biases;

outputting an estimated BEMF measurement; and controlling a voice coil arm of a disk drive based on the estimated BEMF measurement.

8. The method as claimed in claim 7, wherein the removing step further comprises:

separating the VCM command signal into a signal representing a DC/proportional effect on the coil voltage measurement and a transient effect on the coil voltage measurement;

summing the reference voltage deviation, the DC/proportional effect on the coil voltage measurement and the transient effect on the coil voltage measurement to obtain a sum; and determining a difference in the sum and the coil voltage measurement.

9. A method for identifying a transient voltage in a voice coil motor, comprising:

constraining a VCM arm to zero velocity;

inputting a range of constant VCM command signals;

recording a steady-state coil voltage measurement;

obtaining a DC/proportional effect on the coil voltage measurement and a reference voltage deviation from nominal and constant sensor biases based on a relationship between the VCM command signals and the coil voltage measurement;

performing a series of step changes to the VCM command signals;

recording transient responses of the coil voltage measurement;

averaging the transient responses of the coil voltage measurement; and obtaining a transient voltage of the voice coil motor.

* * * * *